Oct. 25, 1966    J. ROSÁN    3,280,874
INSERT WITH ANGULAR FLANGE LOCK
Filed May 10, 1965                                   3 Sheets-Sheet 3
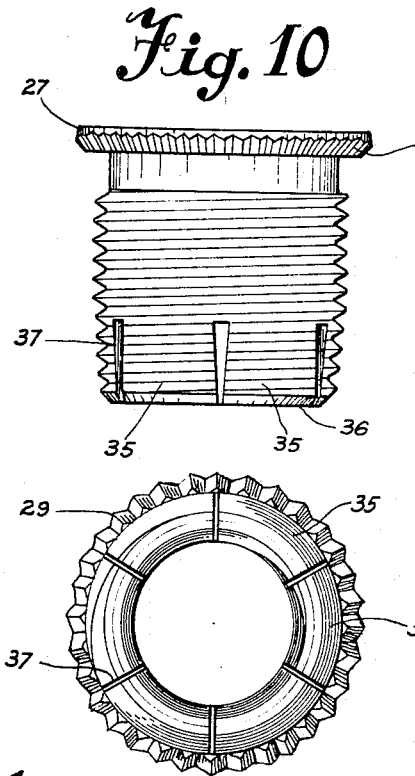
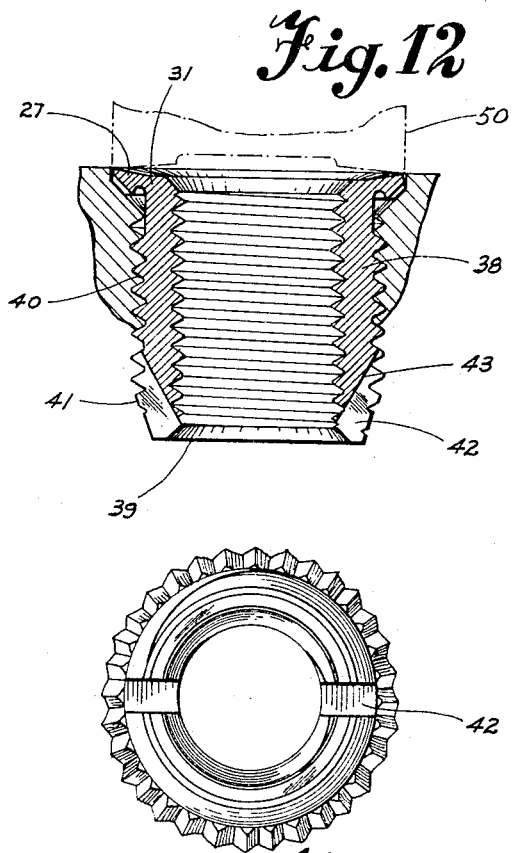
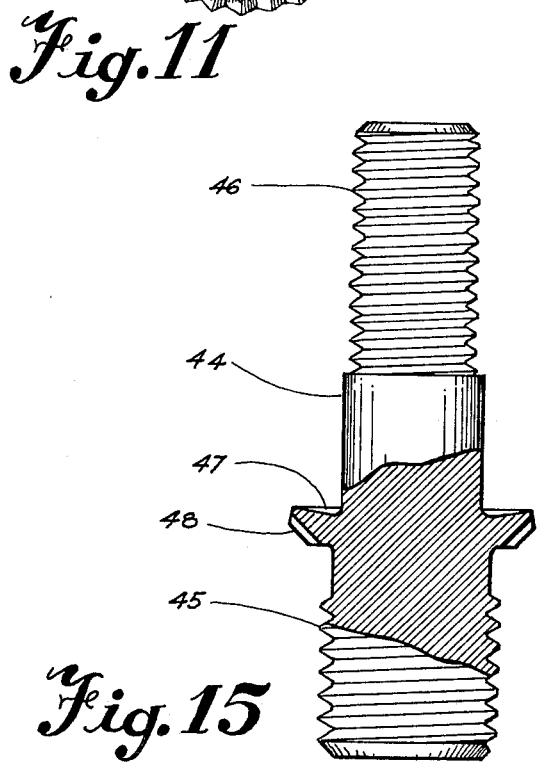
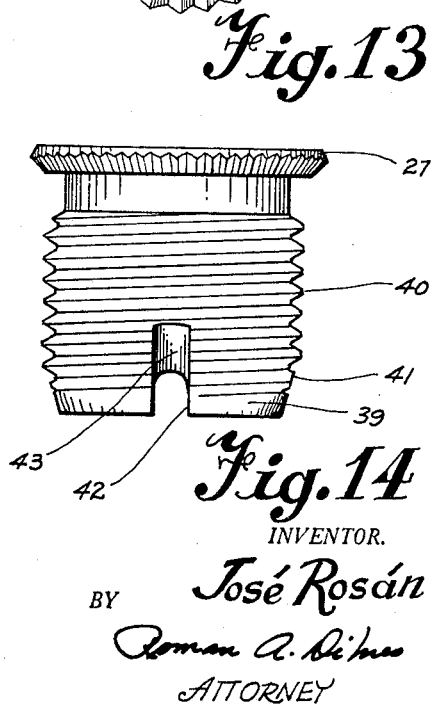
INVENTOR.
José Rosán
BY
Roman A. Ditmer
ATTORNEY

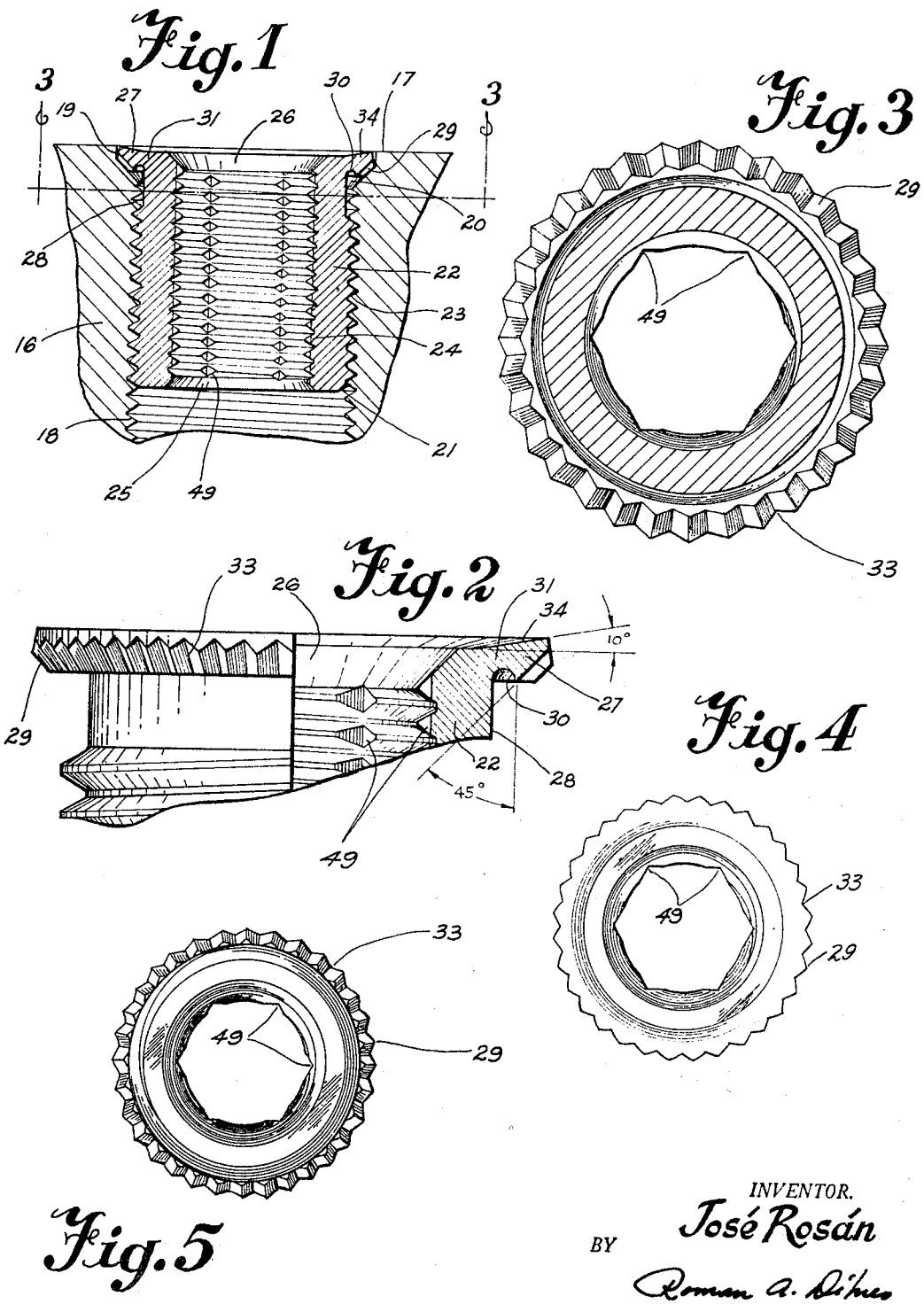

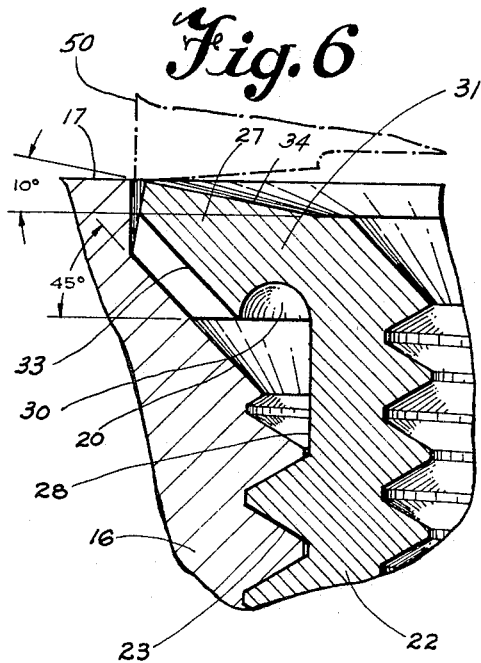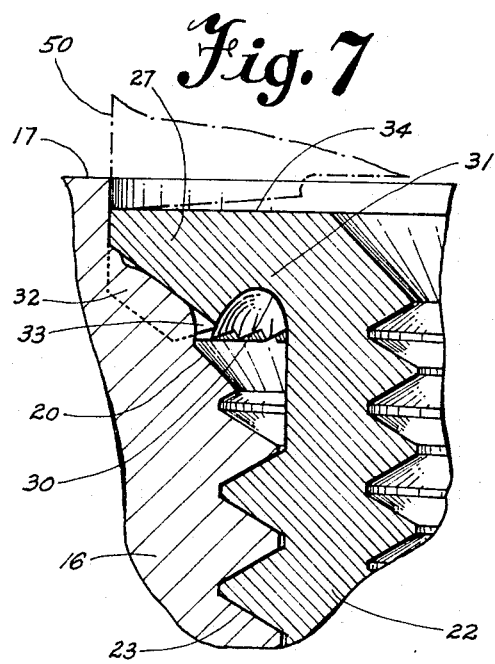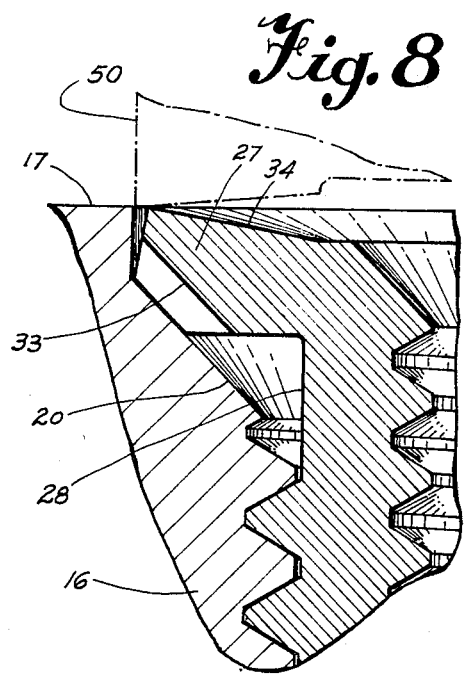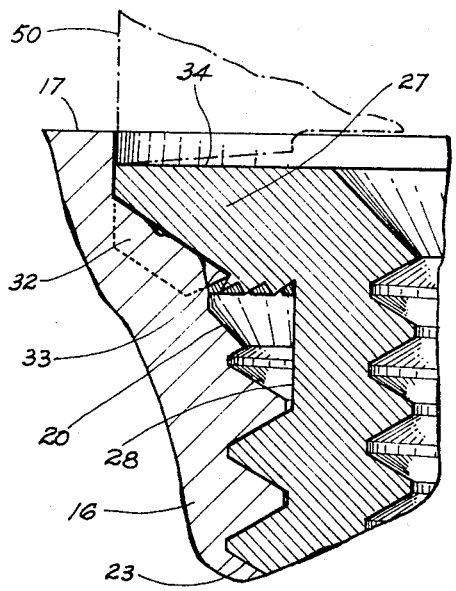

United States Patent Office 3,280,874
Patented Oct. 25, 1966

3,280,874
INSERT WITH ANGULAR FLANGE LOCK
José Rosán, Rancho San Juan, San Juan Capistrano, Calif., assignor to Rosán Engineering Corp., Newport Beach, Calif., a corporation of California
Filed May 10, 1965, Ser. No. 458,818
5 Claims. (Cl. 151—41.72)

This application is a continuation-in-part of application for U.S. Letters Patent, Serial No. 312,953 filed October 1, 1963, entitled "Insert With Angular Flange Lock" and now abandoned.

This invention relates generally to improvements in inserts having external threads for mounting the same in a workpiece and to a method of using same.

More particularly, the invention concerns one-piece inserts designed to be anchored in bores in material relatively softer than the insert material, and the method of using such inserts. The invention finds particular usefulness where the insert is subject to constant vibration and assurance must be provided that the insert will not loosen, or fail, either by axial or rotational displacement. Hence, the present insert is provided with novel locking means to positively hold it in a locked position.

The antirotational locking means of the present insert comprises a flange at the upper end of the body of the insert having an upwardly and outwardly inclined top surface and a lower surface inclined upon a substantially greater angle and provided with serrations on the underside thereof. The present insert is preferably designed to be used in a counterbore which has a conical bottom wall portion formed with a countersink having substantially a 90° included angle, thereby providing an inclined counterbore wall portion disposed on an angle of approximately 45° with respect to the longitudinal axis of the insert body. The insert, prior to locking, is generally seated with the outer edges of the serrations substantially parallel to the inclined portion of the counterbore wall. Thus, when the insert is utilized with a 90° counterbore, before the flange is deflected into locking position the outer edges of the serrations are disposed at substantially 45° angles with respect to the longitudinal axis of the insert body.

The present insert significantly differs from all prior inserts, in that the antirotational locking means is comprised of angularly disposed serrations located on the underside of the insert flange, parallel to the inclined portion of the counterbore surface, said serrations being pressable into said inclined surface so as to "coin" or displace the workpiece material rather than shear or broach said material.

This coining not only prevents the present insert from becoming loose under conditions of excessive vibration, but also eliminates the creation of stress points resulting in reduced useful life of the parent material due to "fatigue" failure, as is sometimes the case at the juncture of a sheared curl and parent material where flange locking devices of the broach or shear type are used. In addition, coining or displacement of the parent material by the locking means of the present insert "cold works" said material and thereby hardens the same so as to create greater resistance to torque forces.

Prior to being deflected into locking position, the top surface of the flange is angularly and outwardly disposed on an angle of approximately 10° with respect to a plane perpendicular to the longitudinal axis of the insert body. An annular groove is provided at the juncture of the flange and insert body for inserts having a very thin body wall, in order to insure the preferential deformation of the flange rather than the insert body wall. Thus, a significant feature of the present invention is that when the flange is deflected into locking position, the flange movement is independent of the body of the insert. That is, the insert body remains relatively stationary and unchanged during the deformation of the flange into its locking position. This eliminates the possibility of damage or distortion of the external threads of the insert or the threads of the bore in the parent material.

Another important feature of the present insert is that the deformation of the angularly disposed locking flange having serrations angularly disposed so as to embed said serrations in the beveled portion of the counterbore wall, coacting with the engagement of the external threads of the insert with the workpiece bore threads, provides a permanently installed insert simultaneously capable of withstanding high torque and axial "pull-out" forces.

Still another feature of the present insert is that it can be utilized with internal locking means and/or self-tapping means and can have walls of any thickness, provided said insert wall thickness in the flange area of the locking means is greater than the least thickness of the flange so that the flange preferably is deformed rather than the insert wall.

Another advantage of the present insert over prior inserts having antirotational locking means is that the angular disposition of the locking means prior to setting thereof results in a more positive lock after deflection, as well as requiring less force to set the same. The requirement of less force to set the flange locking means is due to the relatively small angle of 10° that the flange is deflected and also due to the fact that the workpiece material is coined rather than broached or sheared.

A further advantage is that the angular disposition of the flange serrations allows the use of more liberal tolerances in the dimensions of the locking flange and the prepared bore and counterbore.

Still another advantage is that the exposed top surface of the flange, after the setting of the locking means, is flat and continuous in a plane parallel to the work surface.

Accordingly, the principal object of the invention is to provide an improved, simple one-piece insert of inexpensive construction capable of becoming permanently locked in a workpiece and capable of being installed and locked into place by extremely simple tools.

Another object of the invention is to provide an insert capable of having the insert body stationary and unaffected while the flange lock is deflected into locking position.

Another object is to provide an insert with a locking means requiring a minimal amount of force and flange movement to obtain an antirotational lock.

A further object is to provide an insert with a lock which has greater torque resistance than prior inserts of the same type.

Still another object is to provide an insert with a lock capable of use in a standard 90° counterbore.

Still another object is to provide an insert with a locking flange which has a continuous and uniform surface at its exposed face after locking.

Another object is to provide a special insert embodying a stud.

A further object is to provide a method of using a one-piece lockable insert.

Other objects and advantages of the invention will become apparent from the following description taken in conjunction with the accompanying drawings, in which:

FIG. 1 is an enlarged sectional view of the insert embodying the principles of the present invention, showing the insert driven in a body of relatively soft material prior to deflecting the flange into locking position;

FIG. 2 is a greatly enlarged fragmentary quarter-sectional view of only the insert of FIG. 1, showing the details of the flange and serration configurations;

FIG. 3 is a greatly enlarged horizontal sectional view through the insert, taken on the line 3—3 of FIG. 1;

FIG. 4 is an enlarged top plan view of an insert similar to the type shown in FIG. 1, prior to deflection of the locking flange; provided, however, with serrations having root cavities which intersect the flange top surface so as to provide a serrated configuration at the flange periphery;

FIG. 5 is an enlarged bottom plan view of an insert of the type shown in FIG. 1;

FIG. 6 is a greatly enlarged fragmentary sectional view of the locking flange, showing the serrations carried thereby parallel to the beveled portion of the counterbore wall prior to deflecting into locking position and engaged by a locking tool shown in dot-and-dash lines;

FIG. 7 is a view similar to FIG. 6, but showing the locking flange deflected into locking position by the locking tool and showing the serrations carried by said flange embedded into the beveled portion of the counterbore wall;

FIG. 8 is a view similar to FIG. 6 but showing a modified form of the locking flange of the invention;

FIG. 9 is a view similar to FIG. 7, but of the modified form shown in FIG. 8;

FIG. 10 is an elevational view of an insert having an internal thread lock at its lower end and embodying the basic principles of the present invention, said internal lock being provided with longitudinal slots at its lower end to permit flexible movement of the body segments formed thereby;

FIG. 11 is a bottom plan view of the internal thread locking insert of FIG. 10;

FIG. 12 is a vertical sectional view of a self-tapping insert embodying the principles of the present invention mounted in a workpiece and having diametrically opposed tapered notches extending through its side walls at the lower end thereof and with its locking flange seated in a counterbore having a beveled bottom wall portion and engaged by a locking tool (shown in dot-and-dash lines) preparatory to setting said locking flange;

FIG. 13 is a bottom plan view of the self-tapping insert shown in FIG. 12;

FIG. 14 is an elevational view of the self-tapping insert shown in FIGS. 12 and 13; and FIG. 15 is an elevational view, partly in section, of a stud embodying the principles of the present invention.

Referring more particularly to FIG. 1, numeral 16 designates generally a workpiece having an outer surface 17. As illustrated, the workpiece 16 is formed with a threaded bore 18 extending inwardly from the outer surface 17, and an enlarged cylindrical counterbore 19 extending inwardly from surface 17 to a predetermined depth, said counterbore being formed at its bottom with an outwardly facing beveled shoulder 20.

The insert is constructed of any suitable material relatively harder than the workpiece 16 and is generally identified by the numeral 21, said insert comprising a tubular body 22 provided with external threads 23 and a threaded bore 24. Bore 24 is formed with a plurality of longitudinal grooves 49 intersecting its threads for engagement by a similarly shaped drive tool for driving the insert into the workpiece 16, and is countersunk at 25 at the forward or lower end of the insert and is countersunk at 26 at the rearward or upper end thereof.

The insert body 22 has an integral radial locking flange 27 at its rearward end having an upper surface 34 initially inclined on an angle of approximately 10° with respect to a plane perpendicular to the longitudinal axis of the insert body, as indicated in FIGS. 2 and 6. An external portion 28 of the insert body 22, adjacent the juncture of flange 27 and insert body is plain or unthreaded.

The underside of flange 27 is formed with a plurality of radial serrations 29 having root cavities 33, as shown in FIGS. 2, 3, 4 and 5, said serrations having the outer edges thereof disposed on an angle of approximately 45° to the axis of the insert and adapted to seat against a beveled counterbore shoulder 20, FIG. 6, when the insert is fully screwed in bore 18. The serrations 29 are so disposed that their outer edges or crests are initially preferably flush with the beveled counterbore surface 20, as shown in FIGS. 1, 6 and 8. The flange 27 is so dimensioned that it is confined entirely within counterbore 19, notwithstanding the fact that the diameter across the serrations 29 is greater than the diameter of the flange 27 prior to deflecting the latter into its locked position. In addition, although the roots 33 of serrations 29 are not generally shown herein as intersecting the top surface of flange 27, said roots may do so (as shown in FIG. 4) with advantages as hereinafter described.

The insert flange 27 is further formed with an annular groove 30 providing a weakened section 31 between the serrations 29 and the juncture of said flange and the insert body to permit ready deflection or bending of the flange 27 for locking the insert in the workpiece 16.

By applying axial pressure with a tool 50 to flange 27, as in FIGS. 6, 8 and 12, the flange is axially deflected downwardly, or bent into a position with the top surface 34 substantially at right angles to the longitudinal axis of the insert body 22, as shown in FIGS. 7 and 9. During this action, serrations 29 are pressed into the beveled countered-bore shoulder 20 thereby displacing the workpiece material 32 into the root cavities 33 of said serrations as shown in FIGS. 7 and 9, so as to result in a positive seating and locking of flange 27. The displaced material 32 of the workpiece 16 is thus cold worked and hardened thereby creating greater resistance to torque forces. The seating and locking of flange 27 results in the exposed surface 34 thereof lying in a plane parallel to the workpiece surface 17, as shown in FIGS. 7 and 9. If desired, root cavities 33 may be of a depth whereby said root cavities intersect the flange top surface to result in a serrated configuration at the flange periphery, thereby increasing the insert's resistance to torque forces due to the accommodation of an additional amount of workpiece material in said roots. In addition, extending the root cavities so as to intersect the flange surface permits a visual means for determining whether the flange is axially deflected into its fully locked position.

FIGS. 8 and 9 illustrate a modified form of insert wherein the groove 30 has been omitted. This may be done in cases where the thickness of the wall of body 22 is greater than the axial thickness of the flange 27 adjacent said body wall so that the downward deflection of the flange 27 to lock the insert in the workpiece bore 18 will not cause distortion of the insert body 22.

FIGS. 10 and 11 show an embodiment of the present insert having a locking portion at its forward end 36 formed by a plurality of slots 37. Concomitantly, resilient segments 35 are formed that are preset by inward deformation so as to decrease the diameter of the internal thread thereon to grip the threaded end of a stud or screw which is threaded into the insert. Rotational and axial displacement of said stud or screw are thus prevented.

FIGS. 12, 13 and 14 illustrate a self-tapping insert 38 embodying the basic principles of the insert 21. The insert 38 is tapered at its forward end 39 so that the external threads 40 have truncated crests 41 in the tapered region. The side wall of the insert contains recesses 42 having an upwardly and outwardly sloping wall 43. The recesses 42 are diametrically opposed and the leading edges of the threads of the recesses 42 perform a thread-cutting function as the insert is screwed into a bore.

In FIG. 15 a modified form of the invention is shown which comprises a stud 44 having an externally threaded portion 45 at the forward end and an externally threaded portion 46 at the rearward end. Stud 44 is formed with a flange 47 and serrations 48 similar to the parts 27 and 29, respectively, of the insert of FIG. 1. Flange 47 of stud 44 may also have a configuration containing an annular groove, as described in FIGS. 1, 2 and 6. Stud 44 is locked in a workpiece by deforming the flange 47 in a manner similar to that described with respect to the flange 27 of the insert 21.

While several embodiments of the invention and their use have been described, it is, of course, understood that the particular embodiments of the invention herein disclosed are for illustrative purposes only, and that various changes may be made therein without departing from the principles of the invention or the scope of the annexed claims.

I claim:
1. A one-piece fastener, comprising:
   a cylindrical body;
   an integral deformable flange projecting radially outwardly therefrom, said flange being inclined on a relatively small angle with respect to a plane perpendicular to the longitudinal axis of said body, the outermost surface of said flange being an interrupted planar surface;
   external threads extending from one end of said body toward said flange;
   a smooth portion provided by said body extending between said external threads and said flange, said smooth portion having a diameter not exceeding the root diameter of the external threads whereby the fastener may be fully screwed into the threaded bore;
   a weakened portion provided by said flange on the underside thereof positioned adjacent said smooth portion whereby the flange may be deformed to a position perpendicular to the body axis;
   a plurality of radial serrations carried by the underside of said flange near the periphery thereof, said serrations having the roots thereof inclined outwardly away from the edge of said weakened section on an angle with respect to a plane perpendicular to the longitudinal axis of said body, the angle of inclination of said inclined serrations permitting the outer edges thereof to seat substantially flush upon the beveled portion of the counterbore in the workpiece whereby upon the application of an axial force the workpiece material is caused to flow into the serration roots, thereby locking the fastener against rotation relative to said workpiece.

2. A one-piece fastener as described in claim 1 wherein the angle of inclination of the flange is approximately 10° and the angle of inclination of the radial serrations of approximately 45°.

3. An insert as defined in claim 1 wherein the serration roots intersect the upper face of the flange so as to provide a serrated periphery to said flange.

4. In combination, a workpiece having a threaded bore with a counterbore at its upper end including an upwardly and outwardly inclined bottom wall, and a fastener, comprising:
   a cylindrical body having external threads engaged with the threads of said bore and a smooth portion adjacent said external threads, said smooth portion having a diameter not exceeding the root diameter of the external threads whereby the fastener may be fully screwed into the threaded bore,
   an integral deformable flange adjacent said smooth portion projecting outwardly from said body and received in said counterbore, said flange being initially inclined upwardly and outwardly on a relatively small angle with respect to a plane perpendicular to the axis of said bore and deformed so as to be substantially parallel to said plane, the outermost surface of said flange being an uninterrupted planar surface, said flange having a weakened portion on the underside thereof adjacent said body to facilitate axial deflection of the flange to a position perpendicular to the body axis;
   a plurality of serrations carried by the underside of said flange, said serrations being initially inclined upwardly and outwardly from the edge of said weakened portion on an angle relative to a plane perpendicular to the axis of the fastener, said serrations being in substantially parallel relation to the inclined bottom wall of said counterbore and in contact therewith when said fastener is fully threaded into said bore, said serrations being pressed into the inclined bottom wall of said counterbore by axially deforming said flange so as to cause the workpiece material to flow into the serration roots, thereby locking the fastener against rotation relative to said workpiece.

5. The combination as described in claim 4 wherein the angle of inclination of the flange is approximately 10° and the angle of inclination of the serrations is approximately 45°.

References Cited by the Examiner

UNITED STATES PATENTS

| | | | |
|---|---|---|---|
| 2,444,145 | 6/1948 | Rosán | 151—41.73 |
| 2,455,855 | 12/1958 | Theurer | 151—41.74 |
| 2,741,289 | 4/1956 | Grow | 151—37 |
| 2,948,279 | 5/1961 | Rosán | 151—41.73 |
| 3,079,970 | 3/1963 | Barry | 151—41.73 |
| 3,131,743 | 5/1964 | Hinkle | 151—41.73 |

FOREIGN PATENTS

| | | |
|---|---|---|
| 370,948 | 4/1932 | Great Britain. |
| 603,984 | 6/1948 | Great Britain. |

CARL W. TOMLIN, *Primary Examiner.*

EDWARD C. ALLEN, *Examiner.*

M. PARSONS, JR., *Assistant Examiner.*